Jan. 12, 1971   P. J. WEAVER   3,554,617
MACHINE TOOLS SLIDE ASSEMBLY
Filed April 1, 1969
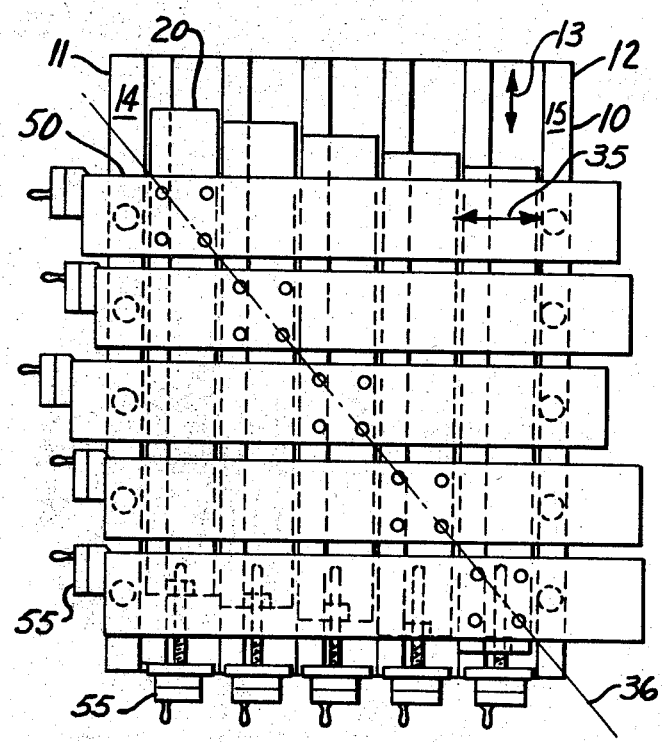
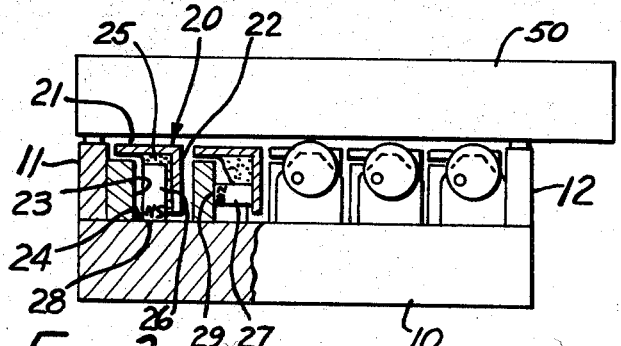
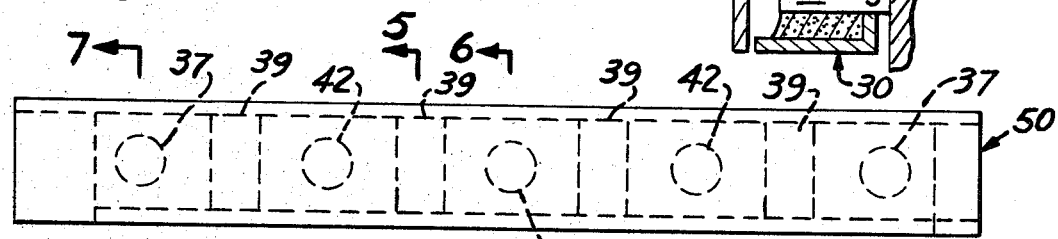
INVENTOR.
PAUL J. WEAVER
BY
ATTORNEYS.

United States Patent Office 3,554,617
Patented Jan. 12, 1971

3,554,617
MACHINE TOOLS SLIDE ASSEMBLY
Paul J. Weaver, 2790 Gainborough Drive,
San Marino, Calif. 91108
Filed Apr. 1, 1969, Ser. No. 811,952
Int. Cl. F16c 17/26
U.S. Cl. 308—3
7 Claims

ABSTRACT OF THE DISCLOSURE

A machine tool slide assembly capable of providing a multiplicity of slides in a minimum area by virtue of a nesting relationship. The assembly is also adaptable to a zero play arrangement by utilizing magnetic attraction between the slide members and the surfaces which guide them.

---

This invention relates to machine tool slide assemblies.

Numerous problems arise in machine tools which are related to their slide assemblies, especially when a plurality of them must be provided along generally parallel axes. An example of such an assembly is to be found in template-guided tracer control mechanisms wherein a plurality of templates need to be relatively closely spaced together and yet be adjustable on two axes. In such circumstances, presently-known slide assemblies are to bulky for convenient use.

Furthermore, is currently-known slide assemblies, there is considerable play due to backlash and side movement because tongue-and-groove or dovetail joints must be utilized which depend for their utility upon clearances. It is an object of this invention to provide a compact multiple-element slide assembly with no play and no backlash.

A device according to this invention is formed upon a base which includes a pair of base stabilizer rails. Along a first axis there is disposed a first axis slide member which is engaged to the base by means of engagement surfaces. There is rigidly attached to the first axis slide member an intermediate member which extends in the direction of a second axis and bears against and slides upon the base stabilizer rails.

A second axis slide rail slides along the respective second axis and is engaged to the intermediate member by second axis slide surfaces whereby the members are slidable along their respective axes independently of each other.

According to a preferred but optional feature of this invention, the engagement of the guide surfaces is magnetic. According to still another preferred but optional feature of the invention the intermediate member is joined to the first axis slide member to respective ones of a plurality of first axis slide members at points along a diagonal path.

The above and other features of this invention will be fully understood from the following detailed description of the accompanying drawings in which:

FIG. 1 is a plan view of the presently-preferred embodiment of the invention;

FIG. 2 is a right-hand view of FIG. 1;

FIG. 3 is a bottom view of FIG. 1 partly in cut-away cross-section;

FIG. 4 is a plan view of a portion of FIG. 1;

FIGS. 5–7 are cross-sections taken at lines 5—5, 6—6, and 7—7, respectively, of FIG. 4.

In FIG. 1 there is shown a base 10 with a pair of base stabilizer rails 11 and 12 extending along a first axis 13. The base stabilizer rails bear stabilizer surfaces 14 and 15, these being parallel to each other and preferably lying in the same plane.

A first axis slide member 20 is preferably formed in the L-shape of an angle-iron with a pair of legs 21, 22 at right angles to each other. They are associated with guide surfaces 23, 24 on the base which extend parallel to the first axis forming a dihedral angle with each other, which is preferably a right angle.

Within the angle formed by the legs, there are adhesively attached by means such as an epoxy potting material 25, a plurality of magnets 26, 27 which have north and south poles at their free ends to form magnetic surfaces 28, 29 which are sometimes also referred to as "guide surfaces." In FIG. 3 magnet 26 is shown in sliding contact with surface 24 and magnet 27 in sliding contact with surface 23. These magnets are alternated in this array along the length of the first axis slide member so as to give support to the first axis slide member in two dimensions. It will thereby be seen that the first axis slide member is engaged to the base for sliding contact along the guide surfaces without play or backlash between them.

As can best be seen in FIGS. 1 and 2, an intermediate member 30 is rigidly attached, such as by bolts or cap screws 31, to the first axis slide member. This is a rigid attachment, and the intermediate members preferably are formed of L-shaped angle irons having legs 32, 33 at the right angles to each other. These extend along a second axis 35. Because there is intended to be a nesting of a plurality of members, the location of attachments of intermediate members to their respective first axis slide members is a matter of considerable importance, and it will be seen that this is accomplished along a diagonal 36 so that the points of attachment are staggered. This permits the close nesting of a plurality of the slides.

Now as can best be seen from FIG. 2, the intermediate members have rigidly attached to them, by means such as potting, three sets of magnetic means. The first set is shown in FIG. 7 which is that set which is intended to bear against the base stabilizer rail. In this case, a magnet 37 with a magnetic surface 38 passes through leg 33 of the intermediate member and bears against the base stabilizer rail. This will stabilize the intermediate member against cocking in a plane normal to the first and second axes.

The next set of magnets is best shown in FIG. 5 where magnet 39 is shown attached by means such as potting material 40 to leg 32 of the intermediate member. A north-south magnetized surface 41 (sometimes called a "guide surface") is formed on the free end of that magnet. The other magnet 42 is attached by means such as potting 43, similarly having a magnetic surface 44, but projecting at right angles to the direction of the magnet shown in FIG. 6. As can best be seen in FIG. 4 such magnets are staggered along the length of the intermediate member so as to provide a guide and adherent means in two planes.

It will be recognized that the various slide members are similarly constructed, and that the parallel ones are identical to those which are described in detail. The purpose of the magnets on the second axis slide member is similar to that of those described in connection with the first axis slide member, and are for the purpose of guiding and supporting second axis slide member 50. L-shaped angle iron with legs 51, 52 which have on their insides guide surfaces 53, 54 respectively. These surfaces extend parallel to the second axis 35.

Now it will be seen that there is a magnetic adherence between the second axis slide member and the intermediate member and also between the first axis slide member and the bed. It therefore is possible for the slide members to be moved independently of each other along their respective axes.

Lead screw adjustment means 55 may be provided for each of the slide members in accordance with known principles.

It will now be seen that this simple arrangement permits a close nesting of a plurality of parallel slide members which is useful independently of the magnetic means, anti-backlash means providing for zero play for mounting the device. When both are used in combination, a uniquely useful, closely packed set of independent slide members results with no play and which is readily built up from easily-manufactured sub-components.

I claim:

1. A slide assembly for guided motion along a pair of non-parallel axes, comprising: a base; a pair of base stabilizer rails extending parallel to a first of said axes, each having a stabilizer surface parallel to the other; a first axis slide member; engaging first axis guide surfaces on the base and on the first axis slide member, one of the said first axis guide surfaces extending parallel to the first axis; an intermediate member rigidly attached to the first axis slide member and bearing against the base stabilizer rails; a second axis slide member; and engaging second axis guide surfaces on the intermediate member and on the second axis slide member, one of the said second axis guide surfaces extending parallel to the second axis, whereby the slide members may be moved on their respective axes, guided and restrained by their respective guide surfaces, and stabilized by sliding contact of the intermediate member with the base stabilizer rails.

2. A slide assembly according to claim 1 in which there is a plurality of said slide member and intermediate members, the respective first axis slide members and intermediate members being rigidly joined at locations disposed along a diagonal path whereby the sets of slide members are nested.

3. A slide assembly according to claim 1 in which one of the guide surfaces of each set constitutes a pair of angularly related slide surfaces extending parallel to the respective axis, and the other constitutes a pair of magnetic surfaces attracted to, bearing again, and slidable along the said slide surfaces.

4. A slide assembly according to claim 3 in which the intermediate member carries magnetic surfaces which are attracted to, bear against, and are slidable along the said base stabilizer rails.

5. A slide assembly according to claim 4 in which there is a plurality of said slide member and intermediate members, the respective first axis slide members and intermediate members being rigidly joined at locations disposed along a diagonal path whereby the sets of slide members are nested.

6. A slide assembly according to claim 5 in which the slide surfaces are formed as a right dihedral angle, and the magnetic surfaces are adhesively attached to the respective members.

7. A slide assembly according to claim 6 in which adjustment means is provided for each of the slide members to shift the same along their respective axes.

References Cited

UNITED STATES PATENTS

| | | | |
|---|---|---|---|
| 3,264,905 | 8/1966 | Erikson | 77—3 |
| 3,270,591 | 9/1966 | Winter | 308—3X |
| 3,441,331 | 4/1969 | Kesling | 308—10X |
| 3,465,669 | 9/1969 | Doudet | 308—3X |
| 3,484,065 | 12/1969 | Walter | 308—3X |

MANUEL A. ANTONAKAS, Primary Examiner